Nov. 18, 1969  A. ELMENDORF  3,478,861
ORIENTING WOOD STRANDS
Filed July 31, 1967  2 Sheets-Sheet 2
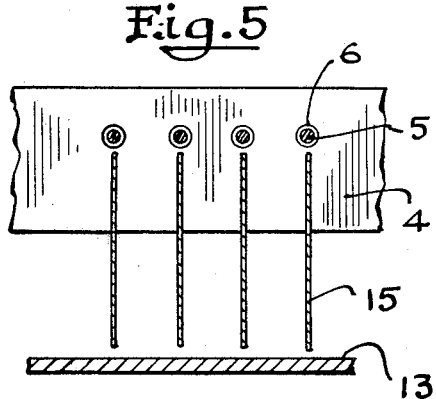
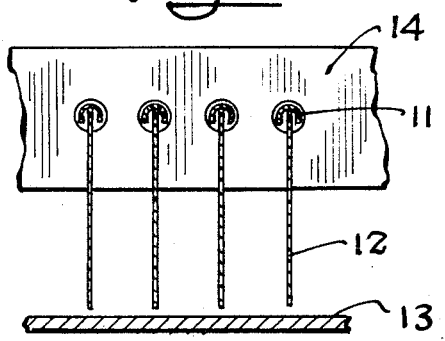
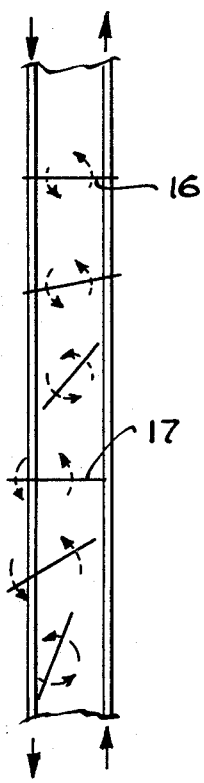
Inventor
Armin Elmendorf
By Edmund A. Godula
Attorney United States Patent Office 3,478,861
Patented Nov. 18, 1969

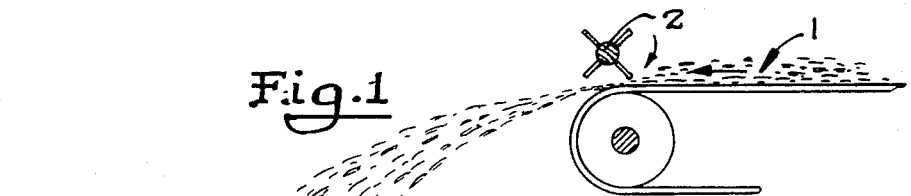
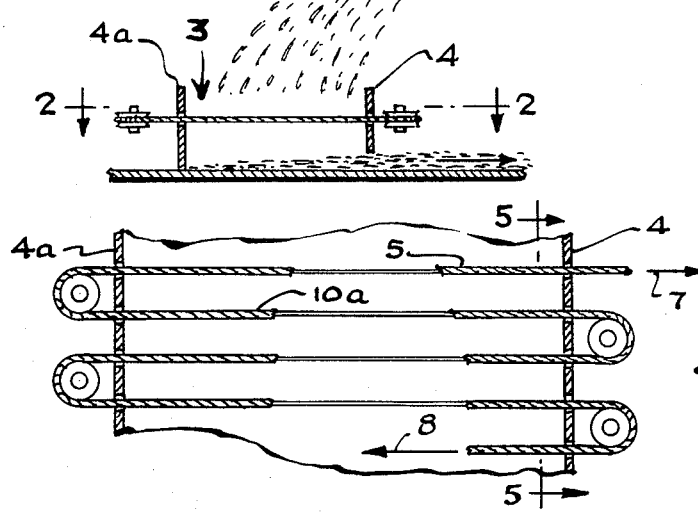
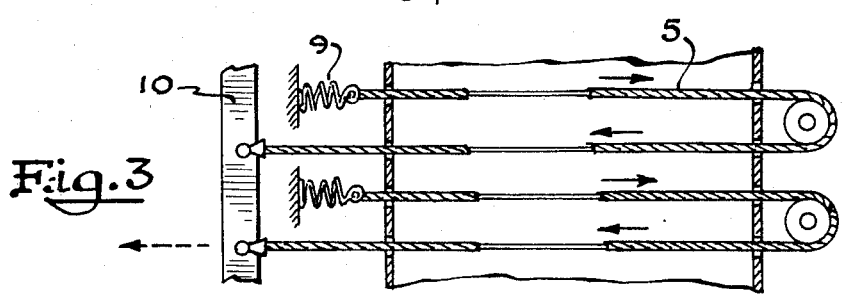
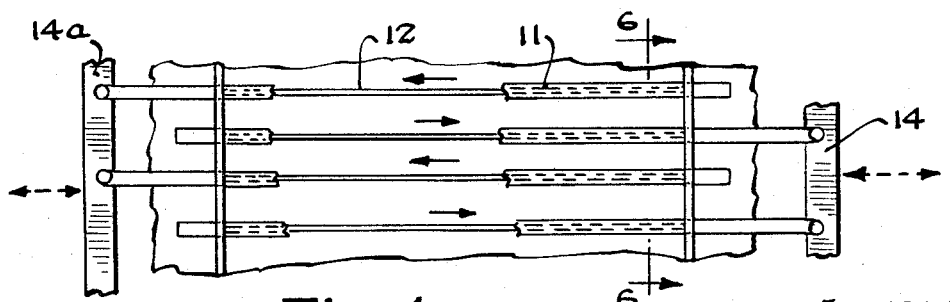

3,478,861
ORIENTING WOOD STRANDS
Armin Elmendorf, 860 Charleston Road,
Palo Alto, Calif. 94303
Filed July 31, 1967, Ser. No. 657,366
Int. Cl. B65g 47/24
U.S. Cl. 198—33      5 Claims

ABSTRACT OF THE DISCLOSURE

A method is described for making board products consisting of wood strands bonded together in substantial parallelism in which binder coated wood strands are allowed to fall freely onto parallel linear supports and adjacent supports are moved alternately in opposite directions so that the strands which come to rest on the supports are rotated through an arc until they slide off the supports and fall down onto a moving caul. The invention includes an apparatus for practicing the method which provides a plurality of parallel spaced linear supports that move in opposite directions, an orienting zone determined by the plane of the supports and lateral walls through which the supports pass, and fixed parallel vertical partition plates.

---

The present invention is concerned with the deposition of wood strands coated with a binder into substantial parallelism so that the mat of wood strands so formed can thereafter be conventionally pressed to form a structural particle board of great strength.

Board products made of wood shavings are commonly called particle boards. When the shavings are long and narrow they are referred to as strands. When making a conventional particle board the shavings are coated with appropriate resins and randomly distributed on caul plates. The assembled shavings are then compacted and bonded together in a hot plate press. If inorganic binders are used such as portland cement the pressing is done at room temperatures.

It is well known that when strands are bonded together in substantial parallel position the resultant board develops great strength in the direction of the strands. A product made in accordance with the foregoing principle is described in U.S. Patent No. 3,164,511 issued to the present applicant. Tests have shown that in one direction particle boards of the oriented strand type such as that described in the foregoing U.S. patent are almost 3 times as strong as conventional particle boards. When a three-ply particle board is made in which the outer layers consist of strands oriented into parallelism and the inner layer consists of randomly distributed strands the product resembles plywood in that it is stronger in the direction of the faces than at right angles to the faces. Such a 3-ply board in which the strands are oriented into parallelism is referred to as Structural Particle Board. When the inner layer of Structural Particle Board is replaced with a ply of veneer and the grain of the veneer is at right angles to the direction of the oriented strand faces, the product is referred to as Tri-Ply. A similar product in which substantially all of the wood strands extend in one direction is known as Mono-Ply.

The foregoing discussion shows that orientation of wood strands into parallelism results in a basically different product from conventional particle board.

Various attempts have been made to orient wood strands into parallelism by mechanical means. In one method the strands fall between vertical plates which are positioned over a moving horizontal caul, the plates being parallel to the direction of the movement of the caul. These plates may be vibrated as disclosed in U.S. Patent No. 3,040,801.

Two difficulties are encountered in all attempts to orient wood strands into parallelism by means of parallel plates. One lies in the fact that the strands rapidly accumulate on the upper edges of the plates and fail to fall between the plates. A second problem invariably encountered lies in the fact that the strands tend to "tuft" as they are deposited on the caul plate. The first few strands which reach the caul plate will fall flat but the succeeding strands have a tendency to assume odd positions at various angles relative to the caul, many strands being positioned on end. The odd positions result in tufting which reduces the structural strength.

One major purpose of the present invention is to overcome the problems stated above. The method and apparatus disclosed herein greatly reduce tufting, and furthermore, the accumulation of strands on the upper edges of partition plates is eliminated. Superior orientation into parallelism is obtained. By this is meant that the average deviation from perfect parallelism is greatly reduced.

The foregoing objects, as well as still other objects which will occur to those skilled in the art, will be noted from the following description of the invention, which includes drawings wherein:

FIGURE 1 is a highly schematic elevation of an apparatus for projecting coated strands and allowing them to fall freely on the orienting device, said apparatus having parts removed and parts out of proportion;

FIGURE 2 is a schematic top plan view, on an enlarged scale, along section line 2—2 of FIGURE 1 with parts removed, showing one form of the device for orienting strands into parallelism;

FIGURE 3 is a schematic top plan view, similar to FIGURE 2, and with parts removed to indicate one means for producing linear movement in adjacent parts in opposite directions;

FIGURE 4 is a schematic top plan view similar to FIGURE 2, and with parts removed, showing another means for practicing the process.

FIGURE 5 is a schematic section view along line 5—5 of FIGURE 2 showing the orienting cords and the partition plates beneath the cords.

FIGURE 6 is a schematic section view along line 6—6 of FIGURE 4 and is similar to FIGURE 5, the orienting cords being replaced by capping channels; and FIGURE 7 is a schematic representation showing various positions assumed by wood strands on a pair of adjoining parallel linear supports as the supports move in opposite directions.

In FIGURE 1 the coated strands 1 are carried by a belt to a picker roll 2 where they are thrown forward to fall freely on the orienting means 3 which, in turn, may be of various forms as shown in FIGURES 2, 3, and 4. The area between the end walls 4 and 4a of FIGURE 1 is the zone of orientation.

In FIGURE 2 the cord or belt 5 is under tension and turns around opposite sets of laterally spaced rollers. It forms parallel linear supports upon which many strands that are longer than the distance between the supports come to rest. The sections of adjacent cords in the orienting zone move in opposite directions. In doing so the strands that span the supports are rotated through a small arc in a plane parallel to the supports until they slide off and fall down between the supports. FIGURE 5 shows the cords 5 passing through holes 6 in the plates 4.

In FIGURE 2 one end of the cord 5 is being pulled in the direction 7 and the opposite end of the cord is pulled in the direction 8. Any reciprocating means may be used to alternate the direction of the pull such as a crank and connecting rod, not shown. The two ends are pulled alternately, thereby alternating the direction of the movement of each support in the orienting zone.

Another method of alternating the direction of movement of the linear supports is shown in FIGURE 3 in which one end of the cord 5 is attached by means of a spring 9 to a fixed support. The opposite end of each cord is attached to an oscillating bar 10. As the bar 10 moves back and forth the sections of the cord in the oscillating zone move alternately in opposite directions.

The orienting means shown in FIGURE 4 consist of longitudinal channels 11 that cap the fixed plates 12 of FIGURE 6 and slide along the upper edges of these plates. The plates extend from the channels at the upper edge to the caul 13 near the lower edge. The channels are attached to bars 14 and 14a that move back and forth. They, too, move in opposite directions so that strands falling on the upper edges of the channels are moved through an arc until they fall between the supports.

A cord or wire may be used in place of the capping channel, in which case the cord is subjected to tension as by means of springs shown in FIGURE 3.

It will be noted from FIGURE 7 that the strands are rotated through an arc until they slide off the supports and fall between them. In their fall they are guided by the partitions 12 as in FIGURE 6 and 15 as in FIGURE 5. The rotation of one strand is indicated by the series starting at 16, and the rotation of another strand by the series starting at 17. Experience has shown that all strands will fall between the supports after a few back and forth strokes of the supports.

In order to assure good orientation, the average length of the strands must exceed the spacing of the linear supports. Good results are obtained if the linear supports are spaced from ⅜-inch to ¾-inch apart.

No features which are conventional are included in the drawings as such parts are well known by those familiar with the art of making particle boards. For example, the frame structure for the apparatus illustrated has not been described, nor has the mechanism for oscillating the bar connecting the linear supports since various means may be used such as a crank and connecting rod. Means for distributing shavings equivalent to a picker roll are well known.

The invention may be practiced in various ways which occur to practitioners, and all such practice is intended to be a part of the present invention provided it comes within the terms of the following claims as given meaning by the language of the preceding specification.

What we claim is:

1. An apparatus to facilitate the deposit of wood strands into substantially parallel orientation which includes
    a plurality of parallel sections of substantially coplanar cords in tension spaced apart a distance less than the average length of the strands,
    a plurality of fixed parallel vertical plates whose upper edges are parallel to and immediately below the sections of the cords,
    a caul plate movable in a horizontal plane parallel to the cords, the lower edges of said fixed parallel vertical plates terminating near said caul plate,
    reciprocating means to impart alternating movement to the cords in their lengthwise direction so that alternate sections of the cords move in unison as a set, one set moving in one direction while the other set moves in the opposite direction, said sets alternating their direction in accordance with the actuation of said reciprocating means, and
    means to project wood strands so that they fall freely onto said parallel sections of each cord.

2. An apparatus as in claim 1 wherein said sections are part of a long flexible cord turnable around a first set of laterally spaced rollers and then around a second set of laterally spaced rollers, and
    including, a zone of orientation bounded by two end plates, openings in each end plate, said sets of rollers being positioned outside said zone of orientation, and said cord sections being movable through said end plate openings.

3. An apparatus as in claim 1 wherein said parallel sections include a plurality of cords, each cord being turnable around a roller, said reciprocating means including means to impart alternating movement to the opposite ends of each cord, and further including, a zone of orientation, two end plates in said zone of orientation, openings in each end plate, said rollers being positioned outside said zone of orientation, and said cord sections being movable through said end plate openings.

4. A method of orienting wood strands into substantial parallelism onto moving caul plates which includes the steps of
    allowing wood strands, coated with a binder to fall freely onto equally spaced, parallel, coplanar and tensioned cord sections whereby the average length of said strands is less than the distance between said cord sections,
    moving each alternate cord section in a longitudinal direction, while simultaneously moving the other set of cord sections in opposite directions,
    reciprocating said movements, thereby turning strands, which have come to rest on two or more cord sections until they reach a near parallel position and fall between said cord sections, and
    guiding said falling strands with parallel, vertical plates positioned underneath each cord section until they come to rest in substantially parallel position on a succession of horizontal moving caul plates.

5. A method of orienting wood strands into substantial parallelism onto moving caul plates which includes the steps of
    turning and tensioning a flexible cord around at least one fixed member so that sections of said cord are parallel and coplanar,
    positioning said sections above said moving caul plates,
    spacing the sections at equal distances which are less than the average length of the wood strands to be deposited onto the caul plates,
    turning the cord around said fixed member to thereby move adjacent sections in opposite longitudinal directions,
    reciprocating the movement of said sections by alternately pulling the opposite ends of said cord, and
    allowing wood strands coated with a binder to fall freely on the sections, whereby
    strands which come to rest on said sections are rotated in arcs lying in a common plane until they slide off the sections and fall onto the moving caul plate.

References Cited

UNITED STATES PATENTS 2,671,550  3/1954  Schultz _____ 198—30
2,840,865  7/1958  Reed _____ 156—62.2

EDWARD A. SROKA, Primary Examiner